US011789875B1

(12) United States Patent
Spinola

(10) Patent No.: US 11,789,875 B1
(45) Date of Patent: Oct. 17, 2023

(54) COMPUTER SLEEP MODE PREVENTION DEVICE

(71) Applicant: Benvinda Spinola, Holbrook, MA (US)

(72) Inventor: Benvinda Spinola, Holbrook, MA (US)

( * ) Notice: Subject to any disclaimer, the term of this patent is extended or adjusted under 35 U.S.C. 154(b) by 0 days.

(21) Appl. No.: 17/736,263

(22) Filed: May 4, 2022

(51) Int. Cl.
*G06F 13/10* (2006.01)
*G06F 13/38* (2006.01)
*G06F 13/42* (2006.01)

(52) U.S. Cl.
CPC ............ *G06F 13/10* (2013.01); *G06F 13/382* (2013.01); *G06F 13/4282* (2013.01); *G06F 2213/0042* (2013.01); *G06F 2213/40* (2013.01)

(58) Field of Classification Search
CPC . G06F 3/0354; G06F 3/03543; G06F 3/03549
See application file for complete search history.

(56) References Cited

U.S. PATENT DOCUMENTS

| 1,564,785 A | 12/1925 | Harris |
| 2,402,463 A | 6/1946 | Miles |
| 7,163,430 B1 * | 1/2007 | Lund ...................... A63H 11/18 446/377 |
| 11,224,016 B2 * | 1/2022 | Larmo .............. H04W 52/0219 |
| 11,625,107 B2 * | 4/2023 | Tabandeh ............... A61B 34/76 606/19 |
| 2018/0067568 A1 * | 3/2018 | Beck ...................... G06F 3/0383 |
| 2020/0293152 A1 * | 9/2020 | Saraya ................... G06F 3/0481 |
| 2020/0326768 A1 * | 10/2020 | Wahl ......................... G06F 1/28 |
| 2020/0412157 A1 * | 12/2020 | Vlasov .................... H02J 50/80 |
| 2022/0011842 A1 * | 1/2022 | Reddy ................... G06F 1/3203 |

* cited by examiner

*Primary Examiner* — Getente A Yimer
(74) *Attorney, Agent, or Firm* — SANCHELIMA & ASSOCIATES, P.A.; Christian Sanchelima; Jesus Sanchelima

(57) ABSTRACT

A computer sleep mode prevention device including a housing assembly, an actuation mechanism, and a connecting assembly. The housing assembly includes a housing, and actuation members. The housing is an ornamental figure. The actuation mechanism is located inside the housing. The actuation mechanism actuates the actuation members to depress a key, swipe a mouse pad or move the mouse of a computer. The connecting assembly includes a cord, the cord is connected to a computer. The connecting assembly connects the computer with the actuation mechanism. The actuation mechanism is powered through the cord. The actuation mechanism is set to actuate the actuation member in predetermined time lapses.

9 Claims, 4 Drawing Sheets

COMPUTER SLEEP MODE PREVENTION DEVICE

BACKGROUND OF THE INVENTION

1. Field of the Invention

The present invention relates to a computer sleep mode prevention device and, more particularly, to a computer sleep mode prevention device that prevents a computer to get into sleep mode.

2. Description of the Related Art

Several designs for a computer sleep mode prevention device have been designed in the past. None of them, however, include an actuation member to press a key of a keyboard to prevent a computer of entering in sleep mode.

Applicant believes that a related reference corresponds to U.S. Pat. No. 1,564,785 issued for an animated toy. Applicant believes that another related reference corresponds to U.S. Pat. No. 2,402,463 issued for a pivoting gravity-operated toy. None of these references, however, teach of a computer accessory for preventing a computer from entering the sleep mode comprising an ornamental figure having an electrically powered moveable limb which is used to touch a mouse pad, or depress keys, where the moving apparatus is powered using a USB cord.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a computer sleep mode prevention device that includes an actuation member capable of move a mouse, swipe a mouse pad, or press a key of a computer to prevent the computer to enter sleep mode.

It is another object of this invention to provide a computer sleep mode prevention device powered through a USB cord which is connected to the computer.

It is still another object of the present invention to provide a computer sleep mode prevention device that includes an actuation mechanism to actuate said actuation member before the computes goes into sleep mode.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
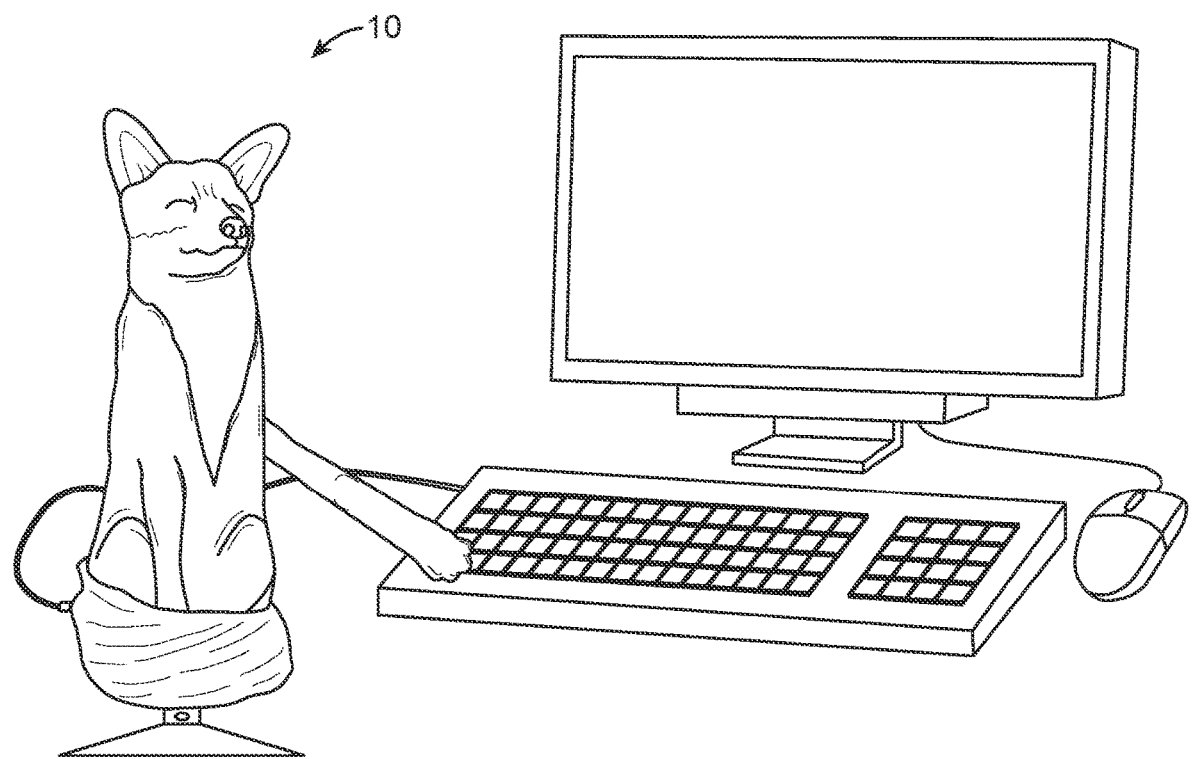
FIG. 1 represents an isometric operational view of the present invention 10 wherein a key of a computer keyboard is being pressed for the pressed invention
Figure 2:
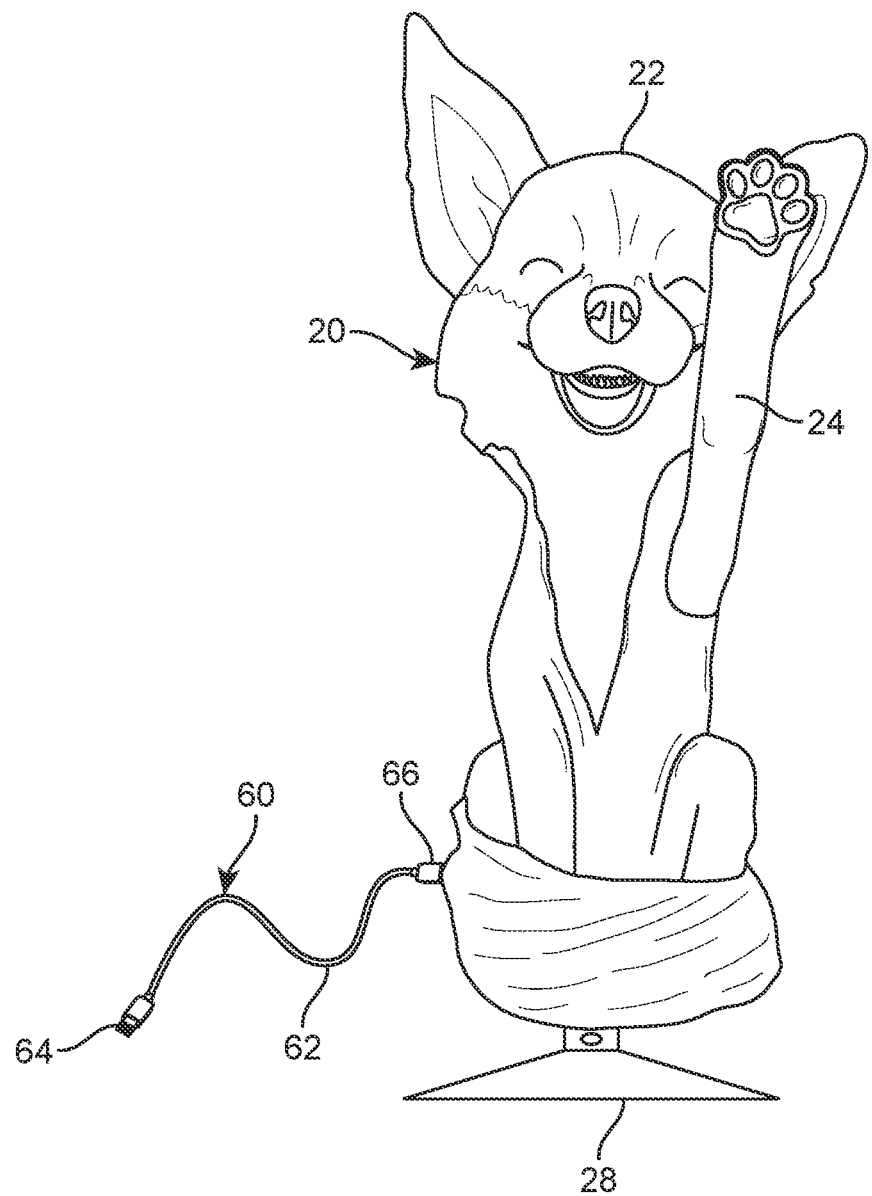
FIG. 2 shows a front view of the housing assembly 20 and the connecting assembly 60 connected therein.
Figure 3:
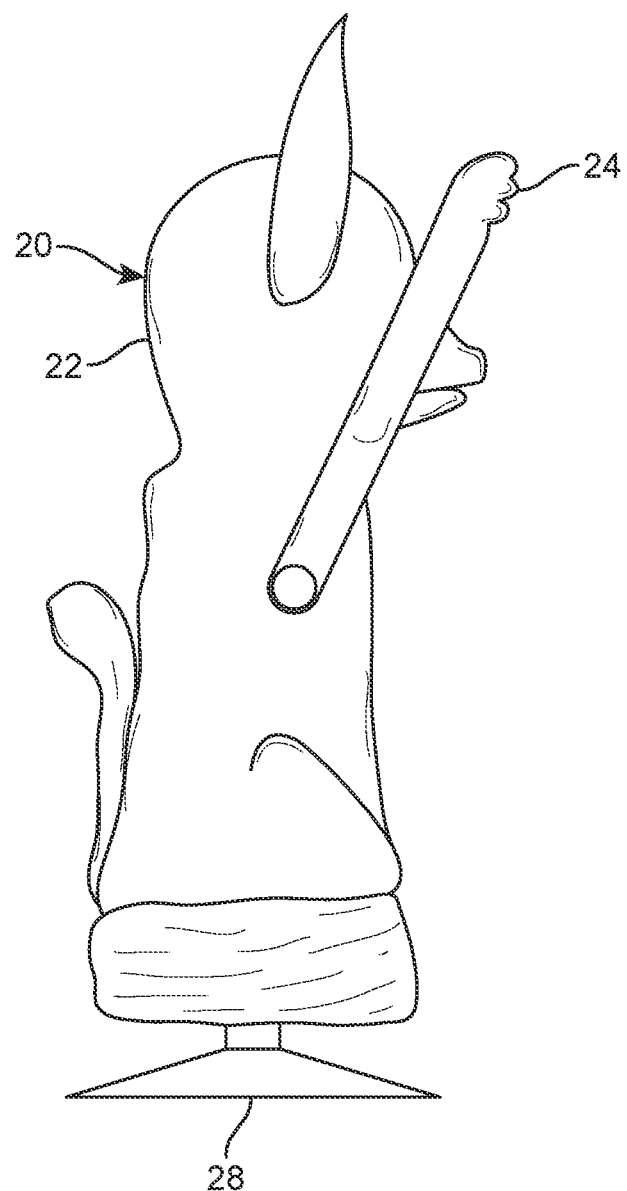
FIG. 3 illustrates a right-side view of present invention 10.

Referring now to the drawings, where the present invention is generally referred to with numeral 10, it can be observed that it basically includes a housing assembly 20, an actuation mechanism 40 and a connecting assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The housing assembly 20 may include a housing 22, an actuation member 24, a suction cup 28 and a connecting port 21. In a preferred embodiment the housing 22 may be an ornamental figure. In a preferred embodiment the housing 22 has the shape of a fox figurine. It also may be suitable for the housing 22 to have a bear figurine shape, a bird figurine shape, a rectangular shape, a cylindrical shape, or any other suitable shape. In a preferred embodiment the housing 22 may be made of plastic. It also may be suitable for the housing 22 to be made of metal, ceramic, wood, or any other suitable material. It may be suitable for the housing 22 to be hollow. The housing may have modifications to receive the other components of the housing assembly 20.

The actuation member 24 may be vertically attached to the housing 22. In a preferred embodiment the actuation member 24 is a limb of the ornamental figure. In a preferred embodiment the actuation member 24 may be made of plastic. It also may be suitable for the actuation member 24 to be made of metal, ceramic, wood, or any other suitable material. In a preferred embodiment the actuation member 24 may rotate back and forth. In a preferred embodiment the actuation member moves inwards and outwards of the housing 22. It also may be suitable for the first actuation member to perform any other movement. In a preferred embodiment the first actuation member 24 may rotate forward to press a key of a computer 80. In a preferred embodiment the actuation 24 member may be actuated to move out of the housing 22 to move a mouse or a mouse pad of the computer 80.

The suction cup 28 may be located on a lowermost end of the housing 22. The suction cup 28 may be attached to lower portion of the housing 22. In a preferred embodiment the suction cup 28 may have a tapered shape. In a preferred embodiment the suction cup 28 may use negative fluid pressure to adhere to a surface. Thus, allowing the housing 22 to adhere to a surface through the suction cup 28. The housing 22 may have a connecting port 21. In a preferred embodiment the connecting port 22 may be a USB port. The connecting port 21 may be located on a lower portion of the housing 22. It also may be suitable for the connecting port 21 to have any other configuration in the housing 22. The connecting port 21 may be connected to the actuation mechanism 40.

Figure 4:
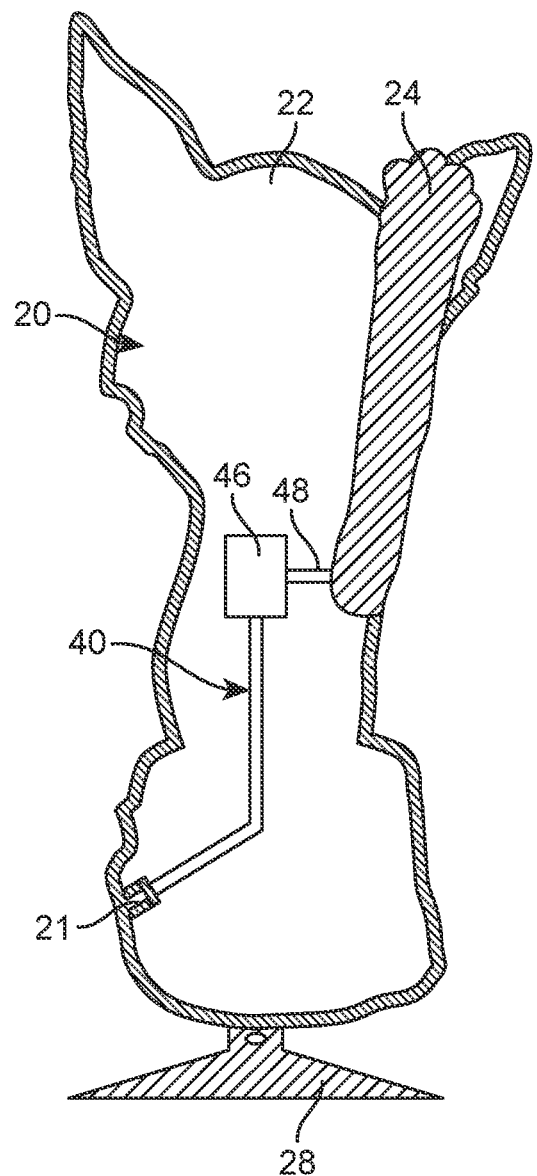
FIG. 4 is a representation of a cross sectional view of the present invention 10. The present invention 10 includes an actuation mechanism 40.

Referring now to the FIG. 4 the actuation mechanism 40 may include an actuating member 42 and a shaft 44. The actuation mechanism 40 is located inside the housing 22. In a preferred embodiment the actuation mechanism 40 may actuate the actuation member 24 in predetermined time lapses. It also may be suitable for the actuation mechanism 40 to receive a signal from a computer to actuate the actuation member 24 before the computer goes into sleep mode. In another embodiment actuation mechanism 40 may actuate the actuation member 24 when the computer enters in sleep mode.

The actuating member 42 may actuate the shaft 44 to push or pull the actuation member 24 inward or outwards of the housing 22 to move the mouse of the computer 80. The actuating member 44 may actuate the shaft 44 to rotate back or forth the actuation member 24 to press the key of the computer 80. The actuating member 42 may receive the signal to actuate through the USB port 21. In a preferred embodiment the actuation mechanism 40 is an electric actuation mechanism. The actuation mechanism 40 may be provided of power through the connecting assembly 60.

The connecting assembly 60 may include a cord 62, a first connector 64 and a second connector 66. The first connector 64 and the second connector 66 may be embedded on the ends of the cord 62. In a preferred embodiment the first connector 64 may be a male USB connector. In a preferred embodiment the second connector 66 may be a male USB connector. The connecting port 21 may be a USB female port. The first connector 64 may be connected to a USB port of a computer 80. The second connector 66 may be connected to the housing 22. Thus, the connecting assembly 60 may connect the invention 10 to the computer 80.

In a preferred embodiment a user connects the invention 10 through the connecting assembly to the computer 80 and place it next to the keyboard of the computer 80 or next to a mouse of the computer 80. The actuation mechanism 40 may be actuated to perform one of the movements described above to move the mouse or depress a key of the computer 80 through the actuation member 24 in predetermined time-lapses.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A computer sleep mode prevention device, comprising:
    a housing assembly, wherein said housing assembly includes a housing and an actuation member, the housing is an ornamental figure, wherein said ornamental figure is a fox shaped ornamental figure;
    an actuation mechanism including an actuating member and a shaft, wherein said actuation mechanism is an electric actuation mechanism, wherein said actuation mechanism is inside said housing, said actuation mechanism is capable of actuate said actuation member to depress a key or move the mouse of a computer, wherein said actuation member moves inwards and outwards of said housing; and
    a connecting assembly, wherein said connecting assembly includes a cord, wherein said cord is connected to a computer, said actuation mechanism is powered by means of said cord, said actuation mechanism actuates said actuation member in predetermined time lapses.

2. The computer sleep mode prevention device set forth in claim 1, wherein said actuation member is actuated by means of said shaft to rotate back and forth said actuation member.

3. The computer sleep mode prevention device set forth in claim 2, wherein said actuation member is a limb of said ornamental figure adapted to press said key of said computer by means of said shaft driven by an electric actuation mechanism.

4. The computer sleep mode prevention device set forth in claim 1, wherein said actuation member is actuated to inwards and outwards of said housing by means of a coupling between said actuation member and said shaft, wherein said shaft is driven by means of said electric actuation mechanism.

5. The computer sleep prevention device set forth in claim 1, wherein said housing assembly includes a connecting port such as an USB port, said connecting port is connected to said electric actuation mechanism.

6. The computer sleep prevention device set forth in claim 5, wherein said cord connects said computer to said electric actuation mechanism by means of said USB connecting port.

7. A computer sleep mode prevention device, comprising:
    a housing assembly, wherein said housing assembly includes a housing, a connecting port and an actuation member, the housing is an ornamental figure, wherein said ornamental figure is a fox shaped ornamental figure, said connecting port is a USB connecting port, said actuation member is actuated by mean of said shaft to rotate back and forth, wherein said actuation member is a limb of said ornamental figure adapted to press said key of said computer by means of said shaft driven by an electric actuation mechanism;
    an actuation mechanism including an actuating member and a shaft, wherein said actuation mechanism is inside said housing, said actuation mechanism is capable of actuate said actuation member to depress a key of a computer, said actuation mechanism is capable of actuate said actuation member to move the mouse of a computer, wherein said actuation member moves inwards and outwards of said housing; and
    a connecting assembly, wherein said connecting assembly includes a cord, wherein said cord is connected to a computer, said cord is connected to said actuation mechanism by means of said connecting port, said actuation mechanism is powered by means of said cord, said actuation mechanism actuates said actuation member in predetermined time lapses to depress a key or swipe the mouse of said computer.

8. A computer sleep mode prevention device, consisting of:
    a housing assembly, wherein said housing assembly includes a housing, a connecting port and an actuation member, the housing is an ornamental figure, the connecting port is a USB connecting port, said ornamental figure is a fox shaped ornamental figure, said actuation member is actuated by means of said shaft to rotate back and forth, wherein said actuation member is a limb of said ornamental figure adapted to press said key of said computer by means of said shaft driven by an electric actuation mechanism, said actuation member is actuated to inwards and outwards of said housing by means of a coupling between said actuation member and said shaft, wherein said shaft is driven by means of an electric actuation mechanism;
    an actuation mechanism, said actuation mechanism defines said electric actuation mechanism, wherein said actuation mechanism is inside said housing, said actuation mechanism is capable of actuate said actuation member to depress a key of a computer, said actuation mechanism is capable of actuate said actuation member to move the mouse of a computer, said actuation member moves back and forth, said actuation member is a limb of said ornamental figure, said actuation member is vertically attached to said housing, said actuation member is actuated to move inwards and outwards of said housing to move said mouse; and a connecting assembly, wherein said connecting assembly includes a cord, wherein said computer is connected to said actuation mechanism by means of said connecting port, said actuation mechanism is powered by means of said cord, said actuation mechanism actuates said actuation member in predetermined time lapses to depress a key or move the mouse of said computer.

9. The computer sleep prevention device set forth in claim 1, wherein said housing assembly further includes a suction cup, said suction cup is placed at a lowermost end of said housing, wherein said suction cup uses negative fluid pressure to adhere to a surface.

\* \* \* \* \*